United States Patent [19]

Shimura et al.

[11] Patent Number: 5,173,850
[45] Date of Patent: Dec. 22, 1992

[54] APPARATUS AND METHOD FOR CHECKING PRINT QUALITY OF TURNAROUND MEDIUM

[75] Inventors: Shigeo Shimura; Koji Miyahara, both of Owariasahi, Japan

[73] Assignee: Hitachi, Ltd., Tokyo, Japan

[21] Appl. No.: 711,405

[22] Filed: Jun. 5, 1991

Related U.S. Application Data

[63] Continuation of Ser. No. 307,040, Feb. 7, 1989, abandoned.

[30] Foreign Application Priority Data

Feb. 12, 1988 [JP] Japan .................................. 63-30162

[51] Int. Cl.⁵ .......................... G06F 15/21; G07B 1/00; G07B 11/00
[52] U.S. Cl. .................................. 364/401; 235/31 T; 235/375
[58] Field of Search ..................... 235/31 T, 37 S, 437, 235/438; 382/57; 356/390; 364/401, 552

[56] References Cited

U.S. PATENT DOCUMENTS

| | | | |
|---|---|---|---|
| 4,480,541 | 11/1984 | Grummett | 101/93.04 |
| 4,587,411 | 5/1986 | Obstfelder et al. | 235/437 |
| 4,630,129 | 12/1986 | Hayashi et al. | 358/296 |
| 4,699,531 | 10/1987 | Ulinski, Sr. et al. | 400/74 |
| 4,813,802 | 3/1989 | Gilham et al. | 400/74 |

FOREIGN PATENT DOCUMENTS

| | | | |
|---|---|---|---|
| 0013453 | 1/1980 | Japan . | |
| 57-111688 | 7/1982 | Japan . | |
| 58-178493 | 5/1983 | Japan . | |
| 58-182795 | 6/1983 | Japan . | |
| 0056563 | 4/1985 | Japan . | |
| 0143172 | 6/1986 | Japan . | |
| 0233576 | 10/1986 | Japan | 400/74 |
| 0262164 | 11/1986 | Japan . | |
| 0262165 | 11/1986 | Japan . | |
| 8501476 | 4/1985 | World Int. Prop. O. | 400/74 |

OTHER PUBLICATIONS

*Patent Abstracts of Japan,* Group No. P452, Abstract No. 60-243767, Satou, Dec. 1985.
*Patent Abstracts of Japan,* Group No. M893, Abstract No. 01-206055, Shimura et al., Aug. 1989.
Kaneko, *Pat. Ab. of Jap.*, vol. 6, No. 46, p. 107, Abstract No. 56-162186, Dec. 1981.
Murakami, *Pat. Ab. of Jap.*, vol. 12, No. 225, E626, Abstract No. 63-18791, Jan. 1988.

*Primary Examiner*—Roy N. Envall, Jr.
*Assistant Examiner*—David Huntley
*Attorney, Agent, or Firm*—Pennie & Edmonds

[57] ABSTRACT

An apparatus and a method for managing issuance of turnaround tickets include a ticket issuing unit for issuing turnaround tickets and test tickets, a separate reading unit for reading the issued tickets, and a control unit for controlling the issuance of turnaround and test tickets. In particular, the test ticket issuing unit issues a test ticket with predetermined test data printed thereon at a predetermined time intervals for use in testing. The turnaround ticket issuing units issues continuously issues a stream of turnaround tickets each having predetermined turnaround ticket data printed thereon until a next test ticket is issued. The test ticket is fed through the reading unit to check the quality of the printed test data. The next set of turnaround tickets are issued only if the test ticket print quality coincides with the known predetermined test data.

21 Claims, 3 Drawing Sheets

APPARATUS AND METHOD FOR CHECKING PRINT QUALITY OF TURNAROUND MEDIUM

This is a File Wrapper Continuation application of Ser. No. 07/307,040, filed Feb. 7, 1989, now abandoned.

BACKGROUND OF THE INVENTION

The present invention relates to a ticket issuance managing apparatus and method, and more particularly to a ticket issuance managing apparatus and method suitable for ensuring a good print quality of tickets of turnaround medium issued by a ticket issuing system, the tickets including data to be read with a reading machine.

A conventional system of this type is known, for example, as disclosed in JP-A-58-178493. According to this system, a ticket issuing unit is constructed of a printing unit for printing data on a ticket, and a print density detecting unit. The print density detecting unit checks the print density of an issued ticket by measuring the density monitor mark printed on the ticket.

In this system, the print density is checked at the ticket issuing unit. However, the print density is not checked at a reading unit by reading the data printed on an issued and turned around ticket. Therefore, this system which prepares the print density detecting function at the printing unit cannot be applied to a conventional ticket issuing system (which prepares a reading function not at the printing unit but only at the reading unit).

Further, if a reading unit of different type is used, the printing unit (ticket issuing unit) should be changed to another type because the reading ability of the printing unit becomes necessary to be comparable with that of the reading unit. Consequently, the degree of freedom of changing a printing unit and hence a system becomes low. In addition, conventional systems cannot check a change of the reading ability of a reading unit.

It is necessary for a turnaround medium issuing system to ensure a good print quality in order the reading unit to correctly read data printed on an issued and turned around ticket. The above-described conventional systems, however, check not the print quality but only the print density. Thus, the conventional systems do not consider the case where poor print quality even with sufficient print density may result in an inability of data read, or data read error, posing a problem of issuing tickets whose data cannot be read or are erroneously read because of poor print quality.

SUMMARY OF THE INVENTION

It is an object of the present invention to eliminate the above-described disadvantages of conventional ticket issuing systems and provide a ticket issuance managing apparatus and method having a large degree of freedom of changing ticket issuing units and reading units.

It is another object of the present invention to provide a ticket issuance managing apparatus and method capable of issuing tickets with good print quality as well as print density, and preventing issuing tickets whose data cannot be read.

To achieve the above objects, in a ticket issuance managing system having a ticket issuing unit for issuing a ticket on which at least print data to be read with a machine is printed, the ticket issuance managing apparatus of this invention is constructed of a reading unit for machine-reading the data printed on a ticket, and a comparing unit for comparing data outputted when the ticket was issued with the data read by the reading unit, and outputting the compared result, whereby a test ticket containing data indicative of test ticket is issued at a predetermined timing by the ticket issuing unit, the data printed on the test ticket are read and compared with the data outputted when the test ticket was issued, and the ticket issuing and other necessary processes start or restart on condition that both data become coincident with each other.

With the ticket issuance managing apparatus constructed as above, the ticket issuing and other necessary processings start or restart on condition that the comparing unit judges that the data read out from a test ticket are coincident with the data read out from a memory in which the data were written when the test ticket was issued. Therefore, it becomes possible to prevent issuing tickets whose data cannot be read because of degraded print quality or the like.

Further, a printed character reading function is prepared not at the ticket issuing unit but only at the reading unit in a similar manner as of a conventional ticket issuing system. Therefore, the present invention is readily applicable to conventional ticket issuing systems.

Furthermore, even if the printed character reading ability of the reading unit changes, the reading unit itself can detect such a change so that the print quality can always be checked correctly.

Still further, the degree of freedom of changing the types of ticket issuing units and reading units is large.

According to the present invention, not only the print density but also the print quality can be checked, and in an abnormal case, the ticket issuance processing can be intercepted automatically. Therefore, it is possible to prevent issuing tickets whose printed characters cannot be read, or are read incorrectly.

DESCRIPTION OF THE PREFERRED EMBODIMENTS

Preferred embodiments of the ticket issuance managing apparatus and method of this invention will be described in detail with reference to the accompanying drawings.

Figure 1:
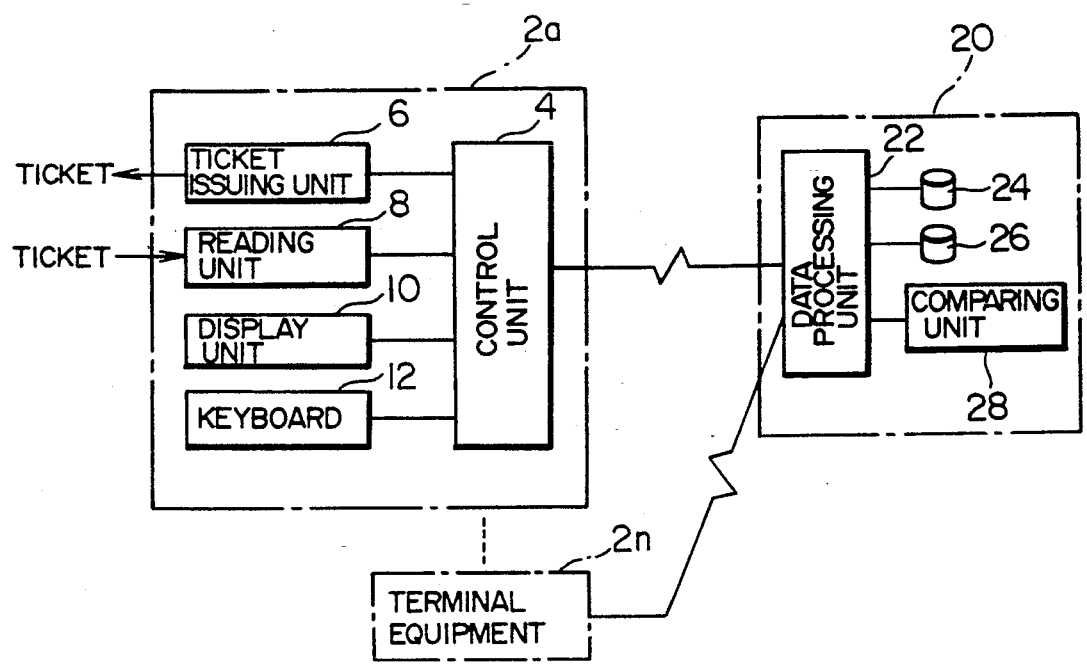
FIG. 1 is a block diagram showing a first embodiment of a ticket issuance managing apparatus according to the present invention.

FIG. 1 is a block diagram showing a first embodiment of the present invention. In the Figure, a plurality of terminal equipments are generally indicated by 2a to 2n, and a central system connected to the terminal equipments is generally indicated by 20. The terminal equipments 2a to 2n each have the same construction which is shown as of the terminal equipment 2a. Each terminal equipment is constructed of a ticket issuing unit 6 for issuing a ticket, a reading unit 8, e.g., an optical card reader, for reading information printed on a ticket, a display unit 10, e.g., a CRT, for displaying information read out from a ticket, information derived from the read-out information, or other information, an input unit 12, e.g., a keyboard, for inputting a ticket issuing instruction, information regarding a ticket, and other information, and a control unit 4 for controlling the respective units 6 to 12 and controlling data communication with the central system 20.

The central system 20 is constructed of a test ticket data file 24, an ordinary ticket data file 26, a comparing unit 28 for comparing information read out from an issued ticket with data used when the ticket was issued, and a data processing unit 22 for controlling the files 24 and 26 and comparing unit 28, and controlling data communication with each terminal equipment.

The control unit 4 and data processing unit 22 each have a central processing unit (CPU) and a memory.

Turnaround medium usable in this invention is preferably a ticket for railway, bus and the like, a lottery ticket, a ballot ticket and so on.

Figure 2A:
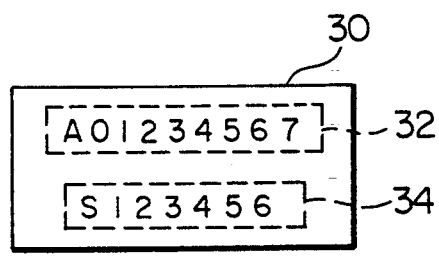
FIGS. 2A and 2B show examples of an ordinary ticket and a test ticket, respectively.

FIG. 2A shows an example of an ordinary ticket 30 issued by the ticket issuing unit 6. The ordinary ticket 30 has a character print area 32 on which ticket information is printed, and a machine-reading area 34 on which identification information specific to a ticket is printed.

The operation of issuing an ordinary ticket by the ticket issuance managing apparatus will be described in brief in the following: A ballot ticket is used in the following description by way of example.

Using the input unit 12 of the terminal equipment 2a, an operator first inputs an ordinary ticket issuance instruction and data, e.g., ballot ticket number, to be printed on the character print area 32. The control unit 4 sends the inputted data to the central system 20.

The data sent from the terminal equipment 2a to the central system 20 are stored in the data file 26. The data file 26 stores therein the data of a plurality of tickets sent from the respective terminal equipments 2a to 2n. It is necessary therefore to distinguish among the data of a plurality of tickets. In view of this, the central system 20 prepares a different identification number for each ticket and adds it to the associated data (ballot ticket number, etc.), both being stored in the data file 26.

Upon completion of registration at the central system 20, the associated data and the identification number of the ticket are sent back to the terminal equipment 2a. The data (ballot ticket number, etc.) and identification number are printed on the ticket at the ticket issuing unit 6 of the terminal equipment 2a and issued therefrom. The resultant ticket 30, as shown in FIG. 2A, has the data (ballot ticket number, etc.) printed on the area 32 and the identification number printed on the area 34.

When the winning ballot number and prize amount are determined at a lot drawing meeting or the like, the ballot ticket numbers stored in the data file 26 are searched using the winning ballot number. The prize amount and other data are added to the ballot ticket number, and the resultant data are stored in the data file 26.

The data printed on the areas 32 and 34 of the ticket 30 issued at the ticket issuing unit and turned around to the reading unit 8 of any one of the terminal equipments 2a to 2n, e.g., are read and sent to the central system 20 via the control unit 4.

Upon reception of the data from the terminal equipment 2a at the data processing unit 22 of the central system, the data processing unit 22 searches the data stored in the data file 26 which data have the same identification number as that contained in the data sent from the terminal equipment 2a. If searched, the data such as prize amount and other data accompanied by the identification number are read and sent back to the terminal equipment 2a which displays the received data on the display unit 10. Such a system performing issuing an ordinary ticket, reading data, and processing data is called a ticket issuing apparatus.

As above, a ticket 30 is issued from one of the terminal equipments and thereafter, read at the reading unit 8 of the same terminal equipment or another terminal equipment for processing data. Such a ticket 30 therefore falls in the category of turnaround medium. In view of turnaround nature of the ticket 30, the print quality and density of printed characters on the machine-reading area 34 should be sufficiently high to allow reading them correctly.

Figure 2B:
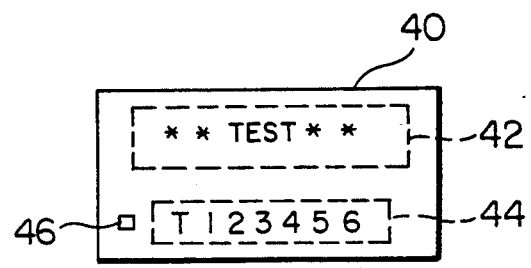

In consideration of the above, according to the present embodiment, a test ticket as shown in FIG. 2B is issued, upon instruction or automatically at a predetermined timing, from the ticket issuing unit of each terminal equipment. Data recorded on the test ticket is read at the reading unit to check the print quality and the like of the test ticket for maintaining a good print quality and the like.

As seen from FIG. 2B, the test ticket 40 is arranged as in the following: It has a sign indicative of test ticket, such as a hole 46. Printed on a character print area 42 are a character string, such as TEST for visual indication of test ticket, and date and number of the terminal equipment 2a. Printed on a machine-reading area 44 is a code string, e.g., "T123456" where T indicates a test ticket, and the following number represents the identification number specific to the test ticket. Use of the hole 46 as the sign indicative of test ticket enables to reliably discriminate a test ticket by detecting the hole 46 with an optical detector mounted on the reading unit even if the printed characters on the areas 42 and 44 are not clear.

Figure 3:
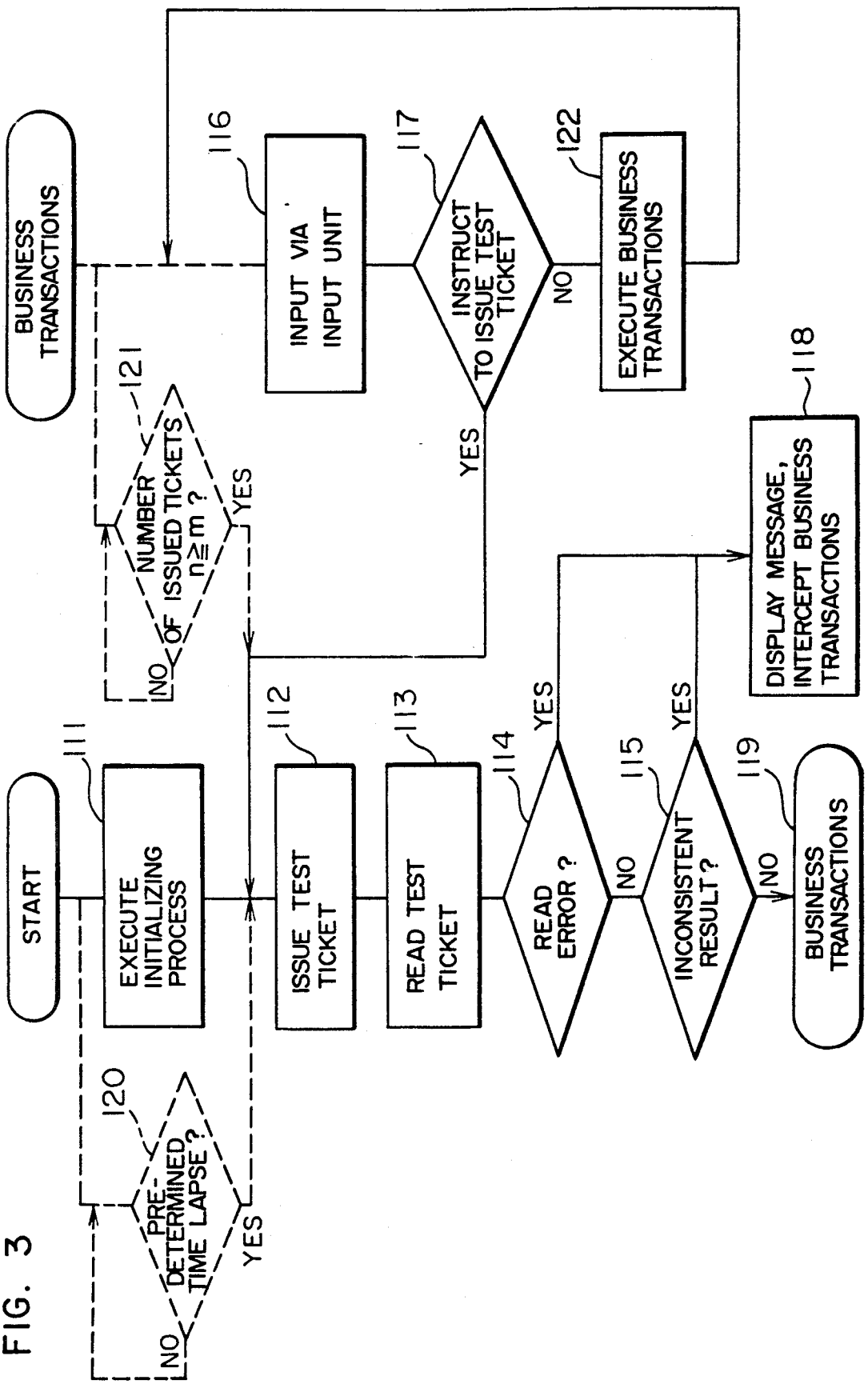
FIG. 3 is a flow chart showing the operation of the first embodiment of this invention.

The operation of the ticket issuance managing apparatus of the embodiment will be described with reference to the flow chart shown in FIG. 3. In this embodiment, a test ticket is arranged to be issued at the time of initializing the ticket issuance managing apparatus, or upon operator instruction from the input unit.

First, at the start of operation of the terminal equipment, e.g., equipment 2a, upon turning on the power, the control unit 4 causes the control program to be loaded and performs initialization and the like of the respective units of the terminal equipment (step 111). Next, the ticket issuance unit 6 issues a test ticket (step 112). The control unit 4 causes the data on the machine-reading area 44 together with the test issuance data and an identifier indicative of the terminal equipment 2a to be sent to the central system 20. The data from the terminal equipment are then stored in the test ticket data file 24 at the area assigned to the terminal equipment 2a. Further, the display unit 10 displays a message instructing to read the test ticket by the reading unit. The central system 20 then stands by until the test ticket is read at the reading unit of a terminal equipment which is in most cases the terminal equipment 2a from which the test ticket was issued.

An operator at the terminal equipment 2a sets the issued test ticket 40 at the reading unit 8 and instructs it to read the characters printed on the machine-reading area 44. The reading unit 8 then checks if the ticket is really the test ticket or not by detecting the hole 46, and reads the data on the area 44 (step 113). The read-out data together with the data certifying the test ticket, and the identifier for the terminal equipment 2a are sent to the central system 20. In response to the data from the terminal equipment 2a, the data processing unit 22 searches the data (identification number) from the file 24 at the area assigned to the terminal equipment 2a and reads them. The readout identification number from the file 26 is compared with the identification number sent from the terminal equipment 2a, to check if both the identification numbers coincide with each other (steps 114 and 115). On condition that both the identification numbers coincide, the data processing unit 22 considers that the print quality is normal, and allows further processing such as business transactions of issuing ordinary tickets, reading data and the like.

Alternatively, if information printed on the area 44 can not be read at all at the reading unit 8, the control unit 4 or data processing unit 22 judges that, for example, the print density has become low, and instructs the display unit 10 to display a message of, e.g., "replacement of the ink ribbon of the ticket issuing unit with a new one", and the business transactions such as issuing tickets are intercepted.

If a part of information printed on the area 44 is read, or if the read-out data does not coincide with the data read out from the file 24, then it can be thought of that the print density is low, that some trouble of the terminal equipment 2a occurred at the time of issuing the test ticket, that the printed character reading ability of the reading unit lowered, and etc. Therefore, in such cases, a message of, e.g., "data inconsistency", "inability of reading part of data", and etc., is displayed on the display unit 10, and the business transactions such as ticket issuing and reading data, or all the processing are intercepted.

An operator performs a necessary task such as replacing the ink ribbon in accordance with the displayed message.

According to the above operation, the good print quality at least at the time of starting each terminal equipment can be ensured, and the print operation can be reliably checked.

Further, in order for the operator to visually check during the business transactions if the print density is low, or for other reasons, the operator inputs a test ticket issuing instruction via the input unit 12 (steps 116 and 117) to make the control unit 4 operate for test ticket issuance (step 112) similar to the case at the time of starting the terminal equipment. The following steps 113 to 115 are performed to conduct reading the test ticket, and comparison of the identification numbers. In case of a read error or data inconsistency, a message is displayed, and the processing is intercepted. With the above operations, it is possible to check the print quality to obtain a good one, and check the print operation during execution of the business transactions, at any desired time.

In the above embodiment, a test ticket may be issued at predetermined timings after the start of the terminal equipment, or each time a predetermined number of ordinary tickets have been issued.

In the former case, a counter such as a soft counter for counting clocks is provided at the control unit 4 of each terminal equipment, and a test ticket issuance instruction is made at predetermined timings after the start of the terminal equipment (step 120).

In the latter case, a counter such as a soft counter for counting the number of ordinary tickets already issued is provided at the control unit 4, and a test ticket issuance instruction is made each time a predetermined number of ordinary tickets have been issued (step 121).

According to the above embodiment, it is possible to check the print quality to obtain a good one, and check the print operation during execution of the business transactions, at any desired time.

Instead of the identification number, symbols to be printed on the area 44 of the test ticket 40 may use any type of printed characters, figures, and the like, including date, only a serial number of a test ticket and the like.

Instead of the hole 46, a sign indicative of test ticket may use a cut-off portion, e.g., at the corner of the test ticket.

Figure 4:
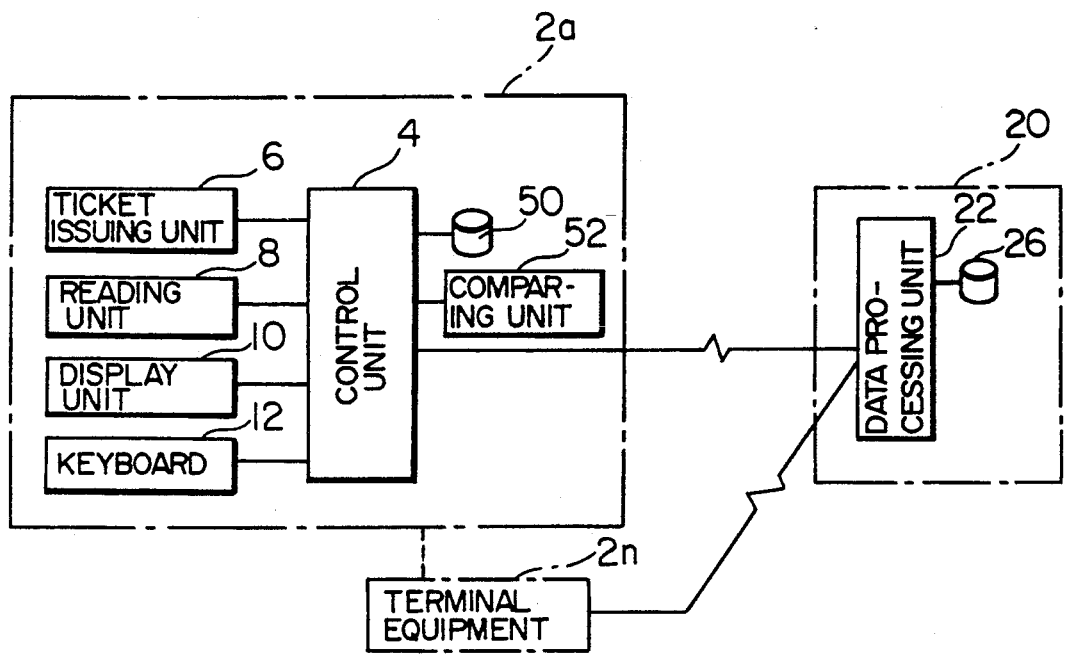
FIG. 4 is a block diagram showing a second embodiment of this invention.

In the above embodiment, the comparing unit 28 and data file 24 have been provided at the central system 20 to check the print quality of a test ticket at the central system 20. However, at least one of the comparing unit and test ticket data file may be provided at each terminal equipment as shown in FIG. 4. Specifically, in the embodiment shown in FIG. 4, a test ticket data file 50 and a comparing unit 52 are provided at each terminal equipment, and the central system 20 is constructed of only the data processing unit 22 and data file 26. Accordingly, although the business transactions for ordinary tickets such as issuing ordinary tickets, reading data, judging data, and the like, are carried out in the similar manner as the first embodiment, the judgment processes, i.e., at steps 114, 115 and 118 shown in FIG. 3, are carried out at each terminal equipment using the control unit 4, data file 50, and comparing unit 52, based on the data read out from the test ticket.

A sign indicative of a test ticket has been provided at the test ticket in the form of the hole 46. However, such a sign may not be provided. Instead, it may be arranged such that when an operator visually recognizes a ticket as a test ticket based on the characters printed on the area 42, the operator inputs via the input unit 12 the data indicating that the ticket now set at the reading unit is a test ticket.

Figure 5:
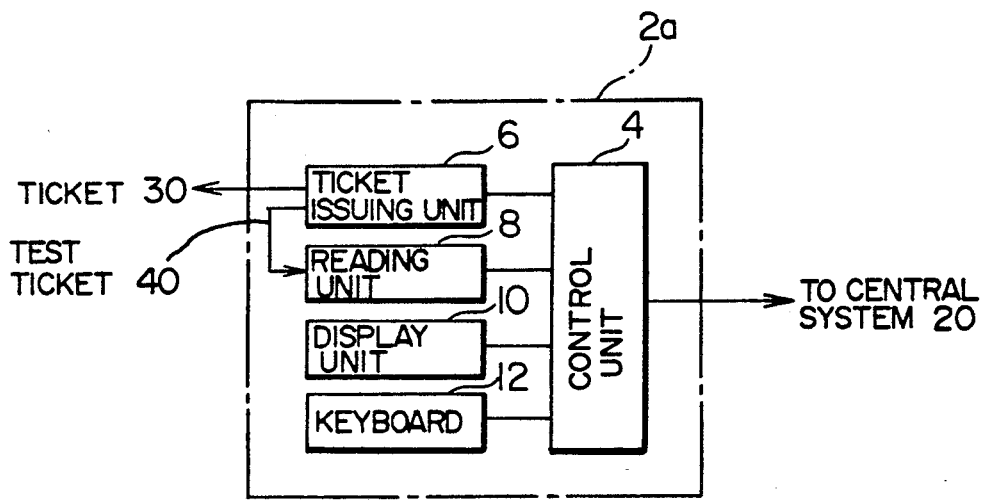
FIG. 5 is a block diagram showing a modification of the terminal equipment according to the present invention.

Further, in the above embodiments, after a test ticket is issued (step 112), it is set at the reading unit 8 to read data therefrom. However, the following arrangement may also be adopted: As shown in FIG. 5, an ordinary ticket issued at the ticket issuing unit 6 of each terminal equipment is once ejected out. However, a test ticket ejected out from the ticket issuing unit 6 is automatically fed to the reading unit 6 to read the data therefrom.

Specifically, the control unit 4 instructs the ticket issuing unit 6 to automatically feed a test ticket issued at step 112 to the reading unit 8 to read the data thereof at the reading unit 8 (step 113).

With such an arrangement, the ticket issuance managing apparatus automatically issues a test ticket at a predetermined timing, checks the print quality, and in case of poor print quality a message is displayed and the business transactions are automatically intercepted.

As described so far, according to the ticket issuance managing system of this invention, a printed character reading function is prepared not at the ticket issuing unit but only at the reading unit in a similar manner as of a conventional ticket issuing system. Therefore, the present invention is readily applicable to conventional ticket issuing systems.

Further, even if the printed character reading ability of the reading unit changes, the reading unit itself can detect such a change so that the print quality can always be checked correctly.

Still further, the degree of freedom of changing the types of ticket issuing units and reading units is large.

According to the present invention, not only the print density but also the print quality can be checked, and in an abnormal case, the ticket issuing processing can be intercepted automatically. Therefore, it is possible to prevent issuing tickets whose printed characters cannot be read, or are read incorrectly.

What is claimed is:

1. A turnaround ticket issuance managing apparatus comprising:
   a ticket issuing unit for issuing a ticket;
   a separate and discrete reading unit for reading the issued ticket; and
   a control means for controlling said ticket issuing unit and said reading unit,
   wherein said ticket issuing unit comprises:
      test ticket issuing means for issuing a test ticket at a predetermined time intervals for use in testing, said test ticket having predetermined test data printed thereto; and
      turnaround ticket issuing means for issuing turnaround tickets which are different from the test ticket, each turnaround ticket having predetermined turnaround ticket data printed thereto, and wherein the issued turnaround tickets are physically separated and removed from the turnaround ticket issuance managing apparatus,
   wherein said reading unit includes reading means for reading data printed on said turnaround tickets and said test tickets, wherein the issued turnaround tickets are fed into said reading unit, and
   wherein said control means comprises:
      memory means for storing said test data;
      comparing means for comparing the printed data read from said test ticket with said test data recorded in said memory means when said test ticket was issued, and for outputting comparison results; and
      control unit for controlling the issuance of said turnaround and test tickets, wherein said control unit continuously issues a stream of said turnaround tickets until a next test ticket is issued, said turnaround tickets being issued after reading test data from the issued test ticket and only when the comparison result of said test ticket by said comparison means indicates that said read-out printed data coincide with said test data stored in said memory means.

2. An apparatus according to claim 1, wherein said control means interrupts the operation of the issuance of said turnaround tickets, when said comparison result of said test ticket by said comparing means indicates an inconsistency between said read-out printed data and said test data stored in said memory means.

3. An apparatus according to claim 1, further comprising display means for displaying said comparison result by said comparing means.

4. An apparatus according to claim 1, wherein said test ticket issuing means issues said test ticket in response to test ticket issuing instruction from said control means.

5. An apparatus according to claim 1, wherein said control means instructs said test ticket issuing means to issue said test ticket at said predetermined time intervals set at initialization of the apparatus.

6. An apparatus according to claim 1, wherein said control means instructs said test ticket issuing means to issue said test ticket at said predetermined time intervals which correspond to each time after a predetermined time lapse after initialization of the apparatus.

7. An apparatus according to claim 1, wherein said control means instructs said test ticket issuing means to issue said test ticket at said predetermined time intervals which correspond to each time after a predetermined number of turnaround tickets have been issued by said turnaround ticket issuing means.

8. A turnaround ticket issuance managing system comprising:
   a plurality of terminal equipment; and
   at least one central system connected to said terminal equipment,
   wherein each terminal equipment comprises:
      test ticket issuing means for issuing a test ticket at a predetermined time intervals for use in testing, said test ticket having predetermined test data printed thereto;
      turnaround ticket issuing means for issuing turnaround tickets which are different from the test ticket, each turnaround ticket having predetermined turnaround ticket data printed thereto, wherein the issued turnaround tickets are physically separated and removed from the turnaround ticket issuance managing system;
      a separate and discrete reading unit for reading data printed on said turnaround tickets and said test tickets, wherein the issued turnaround tickets are fed into said reading unit; and
      control means for controlling said test ticket and turnaround ticket issuing means and said reading unit, wherein said central system comprises:
         memory means for storing said test data;
         comparing means for comparing the printed data read from said test ticket with said test data recorded in said memory means when said test ticket was issued, and for outputting comparison results,
      wherein said control means continuously issues a stream of said turnaround tickets until a next test ticket is issued, said turnaround tickets being issued after reading test data from the issued test ticket and only when the comparison result of said test ticket by said comparison means indicates that said read-out printed data coincide with said test data stored in said memory means.

9. A system according to claim 8, wherein said control means interrupts the operation of the issuance of said turnaround tickets, when said comparison result of said test ticket by said comparing means indicates an inconsistency between said read-out printed data and said test data stored in said memory means.

10. A system according to claim 8, further comprising display means for displaying said comparison result by said comparing means.

11. A system according to claim 8, wherein said test ticket issuing means issues said test ticket in response to test ticket issuing instruction from said control means.

12. A system according to claim 8, wherein said control means instructs said test ticket issuing means to issue said test ticket at said predetermined time intervals set at initialization of the system.

13. A system according to claim 8, wherein said control means instructs said test ticket issuing means to issue said test ticket at said predetermined time intervals which correspond to each time after a predetermined time lapse after initialization of the system.

14. A system according to claim 8, wherein said control means instructs said test ticket issuing means to issue said test ticket at said predetermined time intervals which correspond to each time after a predetermined number of turnaround tickets have been issued by said turnaround ticket issuing means.

15. A method for managing turnaround ticket issuance for use with a ticket issuance managing apparatus which comprises a ticket issuing means for issuing tickets with data printed thereto, a separate reading unit for reading data printed on said tickets, and control means for controlling said ticket issuing means and said reading unit, said method comprising the steps of:

issuing test tickets with test data printed thereto at a predetermined time intervals from said ticket issuing means, said test tickets being used for testing print quality and print density;

storing said test data which is printed on the issued test ticket in memory means;

feeding the test ticket into the reading unit and reading the printed data on the issued test ticket;

comparing the printed data read from the test ticket with the test data stored in said memory means when said test ticket was issued and outputting the comparison result;

continuously issuing a stream of turnaround tickets, each of which is different from the test tickets, until a next test ticket is issued at said predetermined time intervals, wherein said turnaround tickets are issued after reading test data from said test ticket and only when the outputted comparison result indicates that the read-out printed data coincide with said test data stored in said memory means, and wherein said turnaround tickets are physically separated and removed from said ticket issuance managing apparatus and thereafter fed into the reading unit.

16. A method according to claim 15, wherein said control means interrupts the operation of the issuance of said turnaround tickets, when said comparison result of said test ticket by said comparing means indicates an inconsistency between said read-out printed data and said test data stored in said memory means.

17. A method according to claim 15, further comprising the step of displaying said comparison result by said comparing means.

18. A method according to claim 15, wherein said ticket issuing means issues said test ticket in response to a ticket issuing instruction from said control means.

19. A method according to claim 18, wherein said control means instructs said ticket issuing means to issue said test ticket at said predetermined time intervals set at initialization of said apparatus.

20. A method according to claim 18, wherein said control means instructs said ticket issuing means to issue said test ticket at said predetermined time intervals which correspond to each time after a predetermined time lapse after initialization of said apparatus.

21. A method according to claim 15, wherein said control means instructs said ticket issuing means to issue said test ticket at said predetermined time intervals which correspond to each time after a predetermined number of turnaround tickets have been issued by said ticket issuing means.

* * * * *